(12) United States Patent
Shibata et al.

(10) Patent No.: US 7,846,546 B2
(45) Date of Patent: Dec. 7, 2010

(54) ELECTRICALLY CONDUCTING-INORGANIC SUBSTANCE-CONTAINING SILICON CARBIDE-BASED FINE PARTICLES, ELECTROMAGNETIC WAVE ABSORBING MATERIAL AND ELECTROMAGNETIC WAVE ABSORBER

(75) Inventors: Koji Shibata, Ube (JP); Takeshi Kita, Ube (JP); Koji Shiba, Ichihara (JP); Takashi Kino, Utsunomiya (JP); Hideo Sano, Ube (JP); Yoichi Okubo, Ichihara (JP); Shigeru Yao, Ichihara (JP)

(73) Assignee: Ube Industries, Ltd. (JP)

( * ) Notice: Subject to any disclaimer, the term of this patent is extended or adjusted under 35 U.S.C. 154(b) by 1110 days.

(21) Appl. No.: 11/524,104

(22) Filed: Sep. 20, 2006

(65) Prior Publication Data

US 2007/0062719 A1 Mar. 22, 2007

(30) Foreign Application Priority Data

Sep. 20, 2005 (JP) ............................. 2005-272167

(51) Int. Cl.
*B32B 5/16* (2006.01)
(52) U.S. Cl. ...................... 428/403; 428/212; 428/218; 428/331; 428/404
(58) Field of Classification Search ................. 428/403, 428/404, 212, 218, 331
See application file for complete search history.

(56) References Cited

U.S. PATENT DOCUMENTS

| | | | | |
|---|---|---|---|---|
| 3,671,275 A | * | 6/1972 | Gates, Jr. et al. | 501/89 |
| 4,092,459 A | * | 5/1978 | Deffeyes et al. | 428/403 |
| 4,218,507 A | * | 8/1980 | Deffeyes et al. | 428/328 |
| 4,572,844 A | * | 2/1986 | Inoue et al. | 427/180 |
| 4,726,980 A | * | 2/1988 | Ishikawa et al. | 428/212 |
| 5,094,907 A | * | 3/1992 | Yamamura et al. | 428/293.4 |
| 5,223,327 A | * | 6/1993 | Bihy et al. | 428/195.1 |
| 5,759,688 A | * | 6/1998 | Lee et al. | 428/408 |
| 6,254,974 B1 | * | 7/2001 | Hanzawa et al. | 428/212 |
| 6,485,831 B1 | * | 11/2002 | Fukushima et al. | 428/403 |
| 6,777,114 B2 | * | 8/2004 | Kawasaki et al. | 428/698 |

(Continued)

FOREIGN PATENT DOCUMENTS

| JP | 2003-133782 | | | 5/2003 |
|---|---|---|---|---|
| JP | 2003-133782 A | * | | 5/2003 |

OTHER PUBLICATIONS

Bo Zhang et al., "Nanometer silicon carbide powder synthesis and its dielectric behavior in the GHz range", Journal of the European Ceramic Society, (2002) pp. 93-99.

(Continued)

*Primary Examiner*—H. (Holly) T Le
(74) *Attorney, Agent, or Firm*—DLA Piper LLP (US)

(57) ABSTRACT

Silicon carbide-based fine particles containing an electrically conducting inorganic substance and a electromagnetic wave absorbing material, which are fine particles comprising a particle inner portion of a silicon carbide-based material and a surface layer formed of an electrically conducting inorganic substance mainly comprising carbon, wherein a gradient layer with the compositional ratio of the electrically conducting inorganic substance gradiently increasing toward the particle surface is present and the thickness of the electrically conducting inorganic substance gradient layer is from 1 to 500 nm. The electromagnetic wave absorbing material of the present invention can selectively absorb a electromagnetic wave of 1 to 300 GHz in a wide band.

15 Claims, 4 Drawing Sheets

U.S. PATENT DOCUMENTS

| | | | |
|---|---|---|---|
| 6,830,783 B2 | 12/2004 | Fukui et al. | |
| 6,870,497 B2 * | 3/2005 | Kondo et al. | 342/1 |
| 6,962,751 B2 * | 11/2005 | Fukui et al. | 428/408 |
| 7,179,532 B2 * | 2/2007 | Ebert et al. | 428/408 |
| 2002/0025429 A1 | 2/2002 | Fukui et al. | |

OTHER PUBLICATIONS

Saburo Sano et al., "Millmeter-Wave Absorption Measurement of Silicon Carbide Powder by Free-Space Method (Part 1)—Investigation of Measuring Method for Powder Sample-", J.Jpn, Soc. Powder Metallurgy vol. 51, No. 1, 2004, pp. 37-42.

* cited by examiner

ELECTRICALLY CONDUCTING-INORGANIC SUBSTANCE-CONTAINING SILICON CARBIDE-BASED FINE PARTICLES, ELECTROMAGNETIC WAVE ABSORBING MATERIAL AND ELECTROMAGNETIC WAVE ABSORBER

TECHNICAL FIELD

The present invention relates to electrically conducting-inorganic substance-containing silicon carbide-based fine particles and, more specifically, silicon carbide-based fine particles containing an electrically conducting inorganic substance, which have a structure such that the particle inner portion is composed preferably of silicon, carbon, either titanium or zirconium, and oxygen and an electrically conducting inorganic substance layer mainly comprising carbon is present on the particle surface, in which the compositional ratio of the electrically conducting inorganic substance gradiently increases from the inside to the surface of the particle, the electrically conducting inorganic substance layer having a thickness of 1 to 500 nm, the electrically conducting-inorganic substance-containing silicon carbide-based fine particles having a high sphericity; a electromagnetic wave absorbing material comprising the electrically conducting-inorganic substance-containing silicon carbide-based fine particles; and a electromagnetic wave absorber comprising the electromagnetic wave absorbing material and an insulating matrix.

BACKGROUND ART

In the present invention, an electromagnetic wave absorbing material is defined as a material capable of absorbing electromagnetic waves, and an electromagnetic wave absorber is defined as a product (an article) composed of an electromagnetic wave absorbing material designed to absorb electromagnetic waves at a specific wavelength.

Practical research into the electromagnetic wave absorbing materials is believed to have been disclosed first in A. J. Simmons and W. H. Emerson, *I.R.E., National Conv. Record*, 1953. Since then, much research has been done and various electromagnetic wave absorbing materials have been reported.

A carbon-containing material is a material obtained by incorporating carbon particles into urethane foam, styrene foam, rubber or the like, and this is an electromagnetic absorbing material utilizing the electrical conductivity loss of carbon. This material can absorb electromagnetic waves in a relatively high frequency band and, therefore, can be used in an anechoic chamber or the like. However, as the carbon is in the form of electrically conducting particles, reflection from the particle surfaces cannot be avoided. In order to solve this problem, a method of forming an electromagnetic wave-capturing layer by providing a pyramid-like layer or by overlapping materials differing in the particle content density in layers to provide an electromagnetic wave incident surface having a composition close to air is employed. Accordingly, in the case of using carbon fine particles, there is a problem that even a relatively thin pyramid-type electromagnetic wave absorbing material for 1 GHz has a thickness of 200 mm or more and the service space is limited.

Ferrite is a electromagnetic wave absorbing material utilizing the magnetic loss. This is also used by incorporating it into styrene foam, rubber or the like, but this material absorbs electromagnetic waves only in a narrow band of a relatively low frequency (100 MHz to 1 GHz) and is not suitable as an electromagnetic wave absorbing material for a future high frequency band. Furthermore, the main component is iron and therefore, there is a problem that the density is from 5 to 10 $g/cm^2$ and the weight is high as compared with other electromagnetic wave absorbing materials.

A λ/4-type electromagnetic wave absorber is obtained by attaching a resistive film to the surface of a lossless dielectric material lined with a metal sheet. The thickness of the lossless dielectric material is ¼ of the wavelength, and this material does not absorb electromagnetic waves in a wavelength other than the object wave length. Therefore, this is an electromagnetic wave absorber for a very narrow band.

As for the relationship between the absorbing bandwidth and the thickness of existing electromagnetic wave absorbing materials, the tendency in general is such that, when the adsorbing bandwidth is wide, the material is thick and when the material is thin, the absorbing bandwidth is narrow. An electromagnetic wave absorbing material having a small thickness and a wide absorbing bandwidth has not yet been developed.

In order to solve these problems, Japanese Unexamined Patent Publication (Kokai) No. 2003-133782 describes a electromagnetic wave absorber comprising a composite material of electrically conducting inorganic substance-containing inorganic fiber and an insulating matrix, in which the fiber has a composite phase consisting of a silicon carbide-based inside and an electrically conducting inorganic substance surface layer, the compositional ratio of the electrically conducting inorganic substance gradiently increases toward the surface layer of the fiber, the gradient layer of the electrically conducting inorganic substance has a thickness of 1 to 500 nm, and it can selectively absorb electromagnetic waves of 1 to 300 GHz in a wide band. It is indicated that the electromagnetic wave absorbing band and the band width can be arbitrarily controlled by selecting the fiber content or thickness of the electromagnetic wave absorber, or the thickness of or orientation in the surface electrically conducting layer of the fiber used therefor, and/or selecting the fiber content or thickness of the electromagnetic wave transmitting member laminated on the incident surface, or the resistivity or orientation of the fiber used therefor.

The electromagnetic wave absorbing material described in Japanese Unexamined Patent Publication (Kokai) No. 2003-133782 is advantageous, for example, in that the material can also function as a structural material by use as a fiber-shaped material but as only use as fibers is possible, there is a problem that the material itself is very expensive. Furthermore, the production of the electromagnetic wave absorber requires very complicated steps or a special technique and, for example, the fiber must involve the step of forming into a fabric shape at the compounding or must be homogeneously and neatly oriented, and this or other requirements give rise to elevation of the cost of the electromagnetic wave absorber. Also, the fiber-shaped material makes it difficult to fabricate a complicated shape. In addition, the electromagnetic wave absorber composed of a fiber-shaped material has a problem in the surface smoothness, mechanical isotropy, recycling of the electromagnetic wave absorbing material, and the like.

If the electromagnetic wave absorbing material can be formed as fine particles, the step of the shaping into a fiber form is not necessary and the cost of the electromagnetic wave absorbing material can be reduced. The electromagnetic wave absorbing material in a fine particle shape can be easily kneaded with a matrix material such as a resin or a ceramic and processed into a complicated shape by a general shaping technique, so that the production cost of the electromagnetic wave absorber can be reduced. Furthermore, the fine particle shape is advantageous, for example, in that a electromagnetic wave absorber assured of surface smoothness or mechanical isotropy can be obtained or recycling of the electromagnetic wave absorbing material is facilitated.

By taking account of these problems, the present inventors have made intensive studies to obtain a electromagnetic wave absorbing material in a fine particle shape and, as a result, there has been developed a electromagnetic wave absorbing material of electrically conducting-inorganic substance-containing silicon carbide-based fine particles having a structure such that the particle inner portion is composed preferably of silicon, carbon, either titanium or zirconium, and oxygen and an electrically conducting inorganic substance layer mainly comprising carbon is present on the particle surface, in which the compositional ratio of the electrically conducting inorganic substance gradiently increases from the inside to the surface of the particle, the electrically conducting inorganic substance layer has a thickness of 1 to 500 nm and the electrically conducting-inorganic substance-containing silicon carbide-based fine particles have a high sphericity. The present invention provides a electromagnetic wave absorbing material comprising silicon carbide-based fine particles and an insulating matrix, the silicon carbide-based fine particles having a high sphericity, excellent kneadability with resin or the like and excellent electromagnetic wave absorbing property in a wide band, in which the particle inner layer is preferably composed of silicon, carbon, either titanium or zirconium, and oxygen and a layer rich in an electrically conducting inorganic substance mainly comprising carbon is present on the particle surface; a production method thereof; and a electromagnetic wave absorber allowing for processing into a complicated shape.

DISCLOSURE OF THE INVENTION

The present invention relates to electrically conducting-inorganic substance-containing silicon carbide-based fine particles having a structure such that the particle inner portion is silicon carbide-based, particularly, a silicon carbide composed of silicon, carbon, either titanium or zirconium, and oxygen, and an electrically conducting inorganic substance layer mainly comprising carbon is present on the particle surface, in which the compositional ratio of the electrically conducting inorganic substance gradiently increases from the inside to the surface of the particle, the electrically conducting inorganic substance layer has a thickness of 1 to 500 nm, and the electrically conducting-inorganic substance-containing silicon carbide-based fine particles have a high sphericity; a electromagnetic wave absorbing material of the electrically conducting-inorganic substance-containing silicon carbide-based fine particles; and a electromagnetic wave absorber comprising the electromagnetic wave absorbing material and an insulating matrix. According to the present invention, a electromagnetic wave absorber having a electromagnetic wave absorbing property over a wide band, being thin and allowing for processing into a complicated shape can be produced at low cost.

That is, the present invention provides the following.

(1) Silicon carbide-based fine particles containing an electrically conducting inorganic substance, comprising a particle inner portion of silicon carbide-based and a surface layer comprising an electrically conducting inorganic substance mainly comprising carbon, the surface layer covering the entire surface of the particle, wherein the surface layer forms an electrically conducting inorganic substance gradient layer with the compositional ratio of the electrically conducting inorganic substance gradiently increasing toward the particle surface and the thickness of the electrically conducting inorganic substance gradient layer is from 1 to 500 nm.

(2) The silicon carbide-based fine particles containing an electrically conducting inorganic substance as described in (1) above, wherein the silicon carbide-based fine particles further contain at least one member selected from titanium and zirconium.

(3) The silicon carbide-based fine particles containing an electrically conducting inorganic substance as described in (2) above, wherein the elemental composition of the particle inner portion of silicon carbide-based comprises from 20 to 60 mass % of Si, from 0.5 to 10 mass % of at least one member selected from Ti and Zr, from 25 to 65 mass % of C and from 5 to 30 mass % of O.

(4) The silicon carbide-based fine particles containing an electrically conducting inorganic substance as described in (2) above, wherein the elemental composition of the particle inner portion of silicon carbide-based comprises from 25 to 50 mass % of Si, from 0.5 to 8 mass % of at least one member selected from Ti and Zr, from 30 to 55 mass % of C and from 5 to 20 mass % of O.

(5) The silicon carbide-based fine particles containing an electrically conducting inorganic substance as described in (1) above, wherein the elemental composition of the surface layer comprises from 0 to 40 mass % of Si, from 0 to 12 mass % of at least one member selected from Ti and Zr, from 50 to 100 mass % of C and from 0 to 25 mass % of O.

(6) The silicon carbide-based fine particles containing an electrically conducting inorganic substance as described in (1) above, wherein in the surface layer, the compositional ratio of carbon gradiently increases toward the particle surface and the compositional ratio of Si gradiently decreases toward the particle surface.

(7) The silicon carbide-based fine particles containing an electrically conducting inorganic substance as described in (1) above, wherein said silicon carbide-based fine particles an electrically conducting inorganic substance have an average particle size in a range of 0.5 to 20 μm.

(8) The silicon carbide-based fine particles containing an electrically conducting inorganic substance as described in (1), which is produced through the following steps:

(a) a step of providing a precursor polymer comprising a modified polycarbosilane having a structure such that primarily a polycarbosilane having a number average molecular weight of 200 to 10,000 and having a main chain skeleton represented by the formula:

(wherein R represents a hydrogen atom, a lower alkyl or a phenyl group) is modified with an organic metal compound containing titanium or zirconium, (b) a step of microparticulating the precursor polymer to form precursor polymer fine particles, (c) a step of preheating the precursor polymer fine particles in an oxygen-containing atmosphere, to infusibilize the precursor polymer fine particles, (d) a step of firing the infusibilized precursor polymer fine particles in an inert gas atmosphere to obtain silicon carbide-based fine particles, and (e) a step of high-temperature treating the silicon carbide-based fine particles, in an atmosphere such as a reducing gas atmosphere or an inert gas atmosphere containing a very small amount of oxygen, to gradiently increase the compositional ratio of the electrically conducting inorganic substance from the inside to the surface in the surface part of the silicon carbide-based fine particles.

(9) The silicon carbide-based fine particles containing an electrically conducting inorganic substance as described in (8), wherein said step of microparticulating the precursor polymer is performed by a cooling crystallization method of mixing and heating the precursor polymer with a poor solvent of the precursor polymer, to dissolve the precursor polymer in the poor solvent, and cooling the obtained solution to precipitate precursor polymer fine particles.

(10) The silicon carbide-based fine particles containing an electrically conducting inorganic substance as described in (8), wherein said step of microparticulating the precursor polymer is performed by a spray drying method of mixing and heating the precursor polymer with a poor solvent of the precursor polymer, to dissolve the precursor polymer in the poor solvent, and spraying and hot-air drying the obtained solution to form precursor polymer fine particles.

(11) Silicon carbide-based fine particles containing an electrically conducting inorganic substance described in any one of (1) to (10) above.

(12) An electromagnetic wave absorber comprising the electromagnetic wave absorbing material described in (11) and an insulating matrix.

(13) A coating-type electromagnetic wave absorber comprising the electromagnetic wave absorbing material described in (11) and an insulating binder.

The electromagnetic wave absorbing material comprising the electrically conducting-inorganic substance-containing silicon carbide-based fine particles of the present invention can selectively absorb electromagnetic waves of 1 to 300 GHz over a wide band. The electromagnetic wave absorbing band and the bandwidth can be arbitrarily controlled by selecting the content and thickness of the electrically conducting-inorganic substance-containing silicon carbide-based fine particles in the electromagnetic wave absorber, or the thickness of the surface electrically conducting layer of the electrically conducting-inorganic substance-containing silicon carbide-based fine particles used in the electromagnetic wave absorber, and/or selecting the fine particle content, thickness or the like of the electromagnetic wave transmitting layer formed on the incident surface.

BEST MODE FOR CARRYING OUT THE INVENTION

The electrically conducting-inorganic substance-containing silicon carbide-based fine particles, or electromagnetic wave absorbing material, of the present invention are fine particles comprising a particle inner portion of a silicon carbide-based material and a surface layer formed of an electrically conducting inorganic substance mainly comprising carbon, the surface layer covering the entire surface of the particle, wherein an electrically conducting inorganic substance gradient layer with the compositional ratio of the electrically conducting inorganic substance gradiently increasing toward the particle surface is present and the thickness of the electrically conducting inorganic substance gradient layer is from 1 to 500 nm.

The electrically conducting-inorganic substance-containing silicon carbide-based fine particles, or the electromagnetic wave absorbing material, of the present invention have a fine particle shape. As compared with the fibr-form electromagnetic wave absorbing material in conventional techniques, the fine particle shape is advantageous, for example, in that uses to which the fiber material cannot be applied are possible, processing of a complicated shape is facilitated, the material is inexpensive unlike fiber, formation into a fabric shape is not required, the production process such as homogeneous dispersion in a resin or the like is not difficult, the electromagnetic wave absorber is assured of surface smoothness and mechanical isotropy, and the recycling is easy.

Also, in the case where electrically conducting-inorganic substance-containing silicon carbide fibers are ground, as an inorganic fiber is once produced and then ground into fine particles, the production process is complicated and wasteful and the production cost is high. In addition, an electrically conducting inorganic substance exists only in a part on the surface of the fine particles and therefore, the electromagnetic wave absorbing performance is poor. In the electrically conducting-inorganic substance-containing silicon carbide-based fine particles or the electromagnetic wave absorbing material of the present invention, a surface layer formed of an electrically conducting inorganic substance mainly comprising carbon is present to cover the entire surface of the silicon carbide particles and therefore, the above-described defects are overcome.

The electrically conducting-inorganic substance-containing silicon carbide-based fine particles are fine particles comprising a composite phase of a silicon carbide-based phase (first phase) and an electrically conducting inorganic substance (second phase), and in the surface part covering the entire surface of the particles, the compositional ratio of the electrically conducting inorganic substance layer (second phase) is gradiently increased from the inner side of the particles to the fine particle surface.

The silicon carbide-based phase (first phase) may be either amorphous or crystalline and forms the inside phase of the electrically conducting-inorganic substance-containing silicon carbide-based fine particles. The compositional ratio of the first phase is preferably controlled to be from 70.00 to 99.98 vol % based on the entire fine particle(s). With such an compositional ratio, the desired electromagnetic wave absorbing performance can be expressed.

The particle inner portion of the electrically conducting-inorganic substance-containing silicon carbide-based fine particles, or the electromagnetic wave absorbing material, of the present invention are of a silicon carbide-based material. By virtue of the particle inner portion being silicon carbide-based, a surface layer formed of an electrically conducting inorganic substance mainly comprising carbon can be formed on the fine particles by the production method described later and at the same time, physical properties such as lightweight and desired strength can be imparted.

The particle inner portion of a silicon carbide-based material may contain, in addition to silicon and carbon, oxygen and a metal element such as titanium and zirconium, and a silicon oxide and a metal compound such as titanium carbide and zirconium carbide may be present in addition to the silicon carbide. The particle inner portion preferably comprises silicon, carbon, at least one member selected from titanium and zirconium, and oxygen. The elemental composition of the particle inner portion formed of a silicon carbide preferably comprises from 20 to 60 mass % of Si, from 0.5 to 10 mass % of at least one member selected from Ti and Zr, from 25 to 65 mass % of C and from 5 to 30 mass % of O. The elemental composition of the particle inner portion formed of a silicon carbide more preferably comprises from 25 to 50 mass % of Si, from 0.5 to 8 mass % of at least one member selected from Ti and Zr, from 30 to 55 mass % of C and from 5 to 20 mass % of O. If Si is less than 20 mass %, this means that the C content is large in view of the production method and in such a case, the electrical conductivity of the particle may become excessively high and good electromagnetic wave absorbing characteristics may not be obtained, whereas if Si exceeds 60 mass %, the electrical conductivity of the particle may become too low and good electromagnetic wave absorbing characteristics may not be obtained. If at least one member selected from Ti and Zr is out of the range from 0.5 to 10 mass %, the precursor polymer may come to have undesired characteristics and a good fine particle shape may be hard to obtain in the microparticulation step. If C is less than 25 mass %, this means that the Si content is large in view of the production method as described above and, in such a case, the electrical conductivity of the particle may become too low and good electromagnetic wave absorbing characteristics may not be obtained, whereas if C exceeds 65 mass %, the electrical conductivity of the particle may become excessively high and good electromagnetic wave absorbing characteristics may not be obtained. If O is less than 5 mass %, the decomposition excessively proceeds in the firing step and the particle shape may not be maintained, whereas, if O exceeds 30 mass %, the electrical conductivity of the particle may become too low and good electromagnetic wave absorbing characteristics may not be obtained.

In the present invention, the electrically conducting inorganic substance constituting the second phase plays an important role in expressing the objective function and may be either amorphous or crystalline. The compositional ratio of the second phase gradiently increases toward the fine particle surface in the surface part of the fine particles. By virtue of the compositional ratio of the electrically conducting inorganic substance gradiently increasing toward the particle surface, good electromagnetic wave absorbing characteristics can be expressed and at the same time, as compared, for example, with an electrically conducting layer coated on the surface of silicon carbide-based fine particles by the method such as CVD, deterioration such as aggregation of fine particles due to coating or separation of the electrically conducting layer at the handling does not occur.

The thickness of the gradient region is controlled to be from 1 to 500 nm, preferably from 10 to 100 nm. If the thickness of the gradient region is less than 1 nm, electromagnetic waves are not electrically conducted by the fine particle surface and therefore, electromagnetic wave absorbing characteristics are not obtained, whereas if the thickness of the gradient layer exceeds 500 nm, electromagnetic wave reflection occurs on the fine particle surface and the electromagnetic wave absorbing performance decreases. From these reasons, the thickness of the region having a distinct compositional gradient is preferably controlled to be from 1 to 500 nm.

The surface layer formed of an electrically conducting inorganic substance mainly comprising carbon is a portion taking on the function of absorbing a electromagnetic wave. When a surface layer formed of an electrically conducting inorganic substance mainly comprising carbon is formed in the surface part of the particle inner portion of a silicon carbide-based material and the thickness of the layer is adjusted, an electromagnetic wave absorbing material having a broad absorbing band width can be provided. The electrically conducting inorganic substance mainly comprises carbon but may additionally contain electrically conducting inorganic substances such as carbides of Ti, Zr and the like. The electrically conducting inorganic substance may be either crystalline or amorphous. The carbon may be sufficient if it is electrically conducting, and any carbon such as free carbon and graphite may be used. The term "an electrically conducting inorganic substance mainly comprising carbon" means that the carbon content is at least 30 mass % based on the electrically conducting inorganic substance. The carbon content is preferably 50 mass % or more, more preferably 80 mass % or more, still more preferably 90 mass % or more, yet still more preferably 95 mass % or more.

The compositional ratio of the second phase constituting the fine particle surface part is preferably from 0.02 to 30 vol %, more preferably from 1 to 20 vol %. The term "compositional ratio" of the second phase means a ratio of the second phase contained in the entire fine particle(s). If the compositional ratio is less than 0.02 vol %, a electromagnetic wave may not be electrically conducted by the fine particle surface and therefore, good electromagnetic wave absorbing characteristics may not be obtained, whereas if the compositional ratio exceeds 30 vol %, electromagnetic wave reflection may occur on the fine particle surface and the electromagnetic wave absorbing performance may decrease. The compositional ratio of the electrically conducting inorganic substance is a compositional ratio of the total amount of the mainly comprising carbon, and the compositional ratios of all electrically conducting substances constituting the electrically conducting inorganic substance need not be increased. Typically, the compositional ratio of carbon is apparently increased, and the compositional ratio of the carbide of titanium, zirconium or the like is not significantly increased. In an extreme case, the compositional ratio of the electrically conducting inorganic substance except for carbon, such as carbide of titanium or zirconium, may not be increased or may be decreased.

In one preferred embodiment, the elemental composition of the surface layer comprises from 0 to 40 mass % of Si, from 0 to 12 mass % of at least one member selected from Ti and Zr, from 50 to 100 mass % of C and from 0 to 25 mass % of O. If Si exceeds 40 mass %, the electrical conductivity of the particle surface part may decrease and good electromagnetic wave absorbing characteristics may not be obtained. If at least one member selected from Ti and Zr exceeds 12 mass %, the precursor polymer may come to have undesired characteristics and a good fine particle shape may be hard to obtain in the microparticulation step. If C is less than 50 mass %, the electrical conductivity of the particle surface part may become too low and good electromagnetic wave absorbing characteristics may not be obtained. If O exceeds 25 mass %, the electrical conductivity of the particle surface part may become too low and high electromagnetic wave absorbing characteristics may not be obtained.

The electrically conducting-inorganic substance-containing silicon carbide-based fine particles or the electromagnetic wave absorbing material of the present invention can be preferably produced through the following steps:

(a) a step of providing a precursor polymer comprising a modified polycarbosilane having a structure such that primarily a polycarbosilane having a number average molecular weight of 200 to 10,000 and having a main chain skeleton represented by the formula:

(wherein R represents a hydrogen atom, a lower alkyl or a phenyl group) is modified with an organic metal compound containing titanium or zirconium, (b) a step of microparticulating the precursor polymer to form precursor polymer fine particles,

(c) a step of preheating the precursor polymer fine particles in an oxygen-containing atmosphere, to infusibilize the precursor polymer fine particles, (d) a step of firing the infusibilized precursor polymer fine particles in an inert gas atmosphere to obtain silicon carbide-based fine particles, and (e) a step of high-temperature treating the silicon carbide-based fine particles in a reducing gas atmosphere or an inert gas atmosphere containing a very small amount of oxygen to gradiently increase the compositional ratio of the electrically conducting inorganic substance from the inside to the surface in the surface part of the silicon carbide-based fine particles.

In the production of the electrically conducting-inorganic substance-containing silicon carbide-based fine particles or the electromagnetic wave absorbing material of the present invention, the first step (a) is a step of providing a modified polycarbosilane having a number average molecular weight of 1,000 to 50,000, which is used as a precursor polymer for the production of the electrically conducting inorganic substance-containing silicon carbide-based fine particles. As regards the fundamental production method, the modified polycarbosilane can be prepared according to the method described in Japanese Unexamined Patent Publication (Kokai) No. 56-74126. The disclosure of Japanese Unexamined Patent Publication (Kokai) No. 56-74126 is incorporated by reference into this application.

As for the modified polycarbosilane which is a starting material, primarily a polycarbosilane having a number average molecular weight of 200 to 10,000 and having a main chain skeleton represented by the formula:

(wherein R represents a hydrogen atom, a lower alkyl or a phenyl group) and at least one member selected from titanium alkoxide Ti(OR)$_4$ and zirconium alkoxide Zr(OR)$_4$ are reacted under heating in an inert atmosphere to bond at least a part of the silicon atom of the polycarbosilane with titanium or zirconium of the above-described alkoxide through an oxygen atom, whereby a polytitanocarbosilane, a polyzirconocarbosilane or a composite material thereof, having a number average molecular weight of 1,000 to 50,000, is produced.

The organic group R in the titanium alkoxide Ti(OR)$_4$ or zirconium alkoxide Zr(OR)$_4$ is not particularly limited as long as it is removed by decomposition in the third step, but R's are each independently preferably a hydrogen atom or an alkyl group (having a carbon number of preferably 1 to 20, more preferably 1 to 4); provided that at least one R is not a hydrogen atom.

The produced polytitanocarbosilane or polyzirconocarbosilane has a structure such that a titanium or zirconium atom is bonded to the Si atom of the polycarbosilane represented by the formula above through an oxygen atom of the titanium alkoxide or zirconium alkoxide. The remaining bond of the titanium or zirconium atom bonded to the Si atom through an oxygen atom may remain as an alkoxide group or may be partially or entirely bonded to other Si atoms through an oxygen atom to form a crosslinked polycarbosilane structure. In the polytitanocarbosilane or polyzirconocarbosilane, the ratio of the number of all structural units of —Si—CH$_2$— to the number of all structural units of at least either one of —Ti—O— and —Zr—O— is preferably from 2:1 to 200:1. The reaction between a polycarbosilane and a titanium or zirconium alkoxide is known and described in Japanese Unexamined Patent Publication (Kokai) No. 56-74126. Japanese Unexamined Patent Publication (Kokai) No. 56-74126 discloses a polytitanocarbosilane and a production process thereof, and exactly the same may apply to the polyzirconocarbosilane and the production process thereof.

The second step (b) in the production of the present invention is a step of microparticulating the precursor polymer.

In the present invention, after microparticulating the precursor polymer, the precursor polymer fine particles are infusibilized and then fired to produce electrically conducting inorganic substance-containing silicon carbide-based fine particles, whereby a surface layer containing an electrically conducting inorganic substance mainly comprising carbon can be formed on the entire surface of the fine particles and in turn, a fine particulate material excellent in the performance as a electromagnetic wave absorbing material and easy to utilize can be obtained.

As for the microparticulation method, a general solution method requiring no special equipment may be applied. Accordingly, production at low cost is possible. For example, the microparticulation may be performed by a cooling crystallization method of adding the raw material solution for microparticulation to a poor solvent of the modified polycarbosilane and effecting recrystallization. The cooling crystallization method is described below.

In the cooling crystallization method, the precursor polymer is mixed with a poor solvent, which is heated to dissolve the precursor polymer in the poor solvent, the resulting solution is cooled to precipitate the precursor polymer, and the precipitate is separated by filtration, whereby spherical precursor polymer fine particles are obtained. According to the cooling crystallization method, fine particles having a high sphericity can be obtained by virtue of interfacial tension and when the recrystallization conditions are controlled, fine monodispersed particles can be obtained.

The poor solvent usable in the cooling crystallization method is a solvent which cannot dissolve the precursor polymer in the vicinity of room temperature but can typically dissolve it when heated to near the boiling point of the poor solvent. That is, a solvent capable of dissolving-precipitating the precursor polymer by repeating heating-cooling may be used. Preferred examples of the solvent include n-butanol, N-methylpyrrolidone, 1,3-dimethyl-2-imidazolidinone, N,N-dimethylacetamide, ethyl acetate, methyl ethyl ketone, diethyl carbonate, methanol, n-propanol, isopropyl alcohol, methanol, N,N-dimethylformamide, butyl acetate, acetone, isopropyl ether, acetonitrile and dimethyl carbonate. Also, a solvent prepared by combining two or more species thereof may be used. However, the solvent for use in the present invention is not limited to the solvents described above.

The particle diameter of the precursor polymer fine particles obtained by cooling crystallization can be controlled by the cooling rate of the precursor polymer solution. The crystallization phenomenon is, very briefly speaking, a combination of a nuclear generation phenomenon and a nuclear growth phenomenon in a supersaturated solution. In the case of obtaining fine particles having a small particle diameter, when the cooling rate is increased, the supersaturation degree and in turn the number of nuclei generated are increased and thereby, the particle growth is suppressed, as a result, small particles are obtained. On the other hand, in the case of obtaining fine particles having a large particle diameter, when the cooling rate is decreased, the supersaturation degree and in turn the number of nuclei generated are decreased and thereby, the particle growth is accelerated, as a result, a large particle is obtained. A method of decreasing the supersaturation degree by adding an operation of keeping constant the solution temperature during the generation of nuclei is also effective. The time for which the temperature is kept constant is usually from 1 to 100 minutes. The effect may be obtained even when the temperature-holding time is about 1 minute, but in order to more effectively increase the particle diameter, the holding time is preferably 30 minutes or more. In the cooling crystallization method, precursor polymer fine particles of 0.05 to 10 μm can be obtained.

A microreactor method may also be employed as a method for the microparticulation from a poor solvent solution of the precursor polymer. The microreactor includes various types, but a double-tube microreactor method is described here by way of example.

The double-tube microreactor is a microreactor where an inner tube having an internal diameter of about 0.5 mm is inserted into the inside of an outer tube having an internal diameter of about 2 mm and where a good solvent solution of the precursor polymer flows from the inner tube and a poor solvent flows from the outer tube, thereby causing fine particles of the precursor polymer to precipitate in the mixing portion of these two solutions. When the mixing portion of two solutions is kept in the state of layered flow mixing, truly spherical fine monodispersed particles can be obtained. By controlling the ratio of the precursor solution and the poor solvent for this purpose, precursor polymer fine particles of 0.1 to 100 μm can be obtained.

As for the filtration of the precursor polymer fine particles, a known technique may be employed. For example, in the method using a filtration membrane, the nominal pore diameter of the filtration membrane is from 0.1 to 1 μm, preferably from 0.2 to 0.5 μm. The material of the filtration membrane is not particularly limited, but examples thereof include an organic membrane such as collodion, cellophane, acetyl cellulose, polyacrylonitrile, polysulfone, polyolefin, polyamide, polyimide and polyvinylidene fluoride, and an inorganic film such as graphite, ceramic and porous glass. On a laboratory scale, a filter material such as PTFE membrane filter can be used. The filtration operation may be performed under reduced pressure or applied pressure and this is not particularly limited.

The precursor polymer fine particles recovered by the filtration operation are dried to remove the residual solvent, and the drying method is not particularly limited. For example, natural drying, hot air drying, vacuum drying, freeze drying or supercritical drying may be employed.

Furthermore, a spray drying method may also be applied as the means for microparticulation. In the spray drying method, a solution of a modified polycarbosilane in the poor solvent described above is sprayed from nozzles and dried with hot air at a temperature high enough to dry the solvent, that is, from several tens of degrees centigrade to about 250° C., whereby fine particles can be obtained. In the spray drying method, fine particles of 0.1 to 30 μm can be obtained by controlling the solid content concentration or spraying speed of the spray liquid, or the hot air temperature.

The third step (c) in the production of the present invention is a step of preheating the precursor polymer fine particles in an atmosphere containing an oxidizing agent such as oxygen, to infusibilize the precursor polymer fine particles. This step is performed for the purpose of preventing the fine particle from being melted at the subsequent firing step and adhering to the adjacent fine particles. The treating temperature and the treating time thereof vary depending on the composition and these are not particularly limited, but in general, treating conditions of 50 to 400° C. and from several hours to 30 hours are selected. In the oxidative atmosphere described above, a substance capable of enhancing the oxidizability of the fine particle, such as moisture, nitrogen oxide and ozone, may be contained or the oxygen partial pressure may be intentionally changed.

The fourth step (d) in the production of the present invention is a step of firing the infusibilized fine particles obtained in the third step at a temperature of 1,000 to 1,500° C. in an inert gas atmosphere such as argon gas, helium gas and nitrogen gas, to obtain silicon carbide-based fine particles. The inert gas atmosphere may be sufficient if it is inert to the process of firing a polytitanosilazane or polyzirconosilazane and obtaining silicon carbide-based fine particles. The inert gas may be nitrogen, or the like, in addition to a rare gas such as argon and helium.

The fifth step (e) in the production of the present invention is a step of further firing the silicon carbide-based fine particles produced in the fourth step (d), at a temperature of 1,000 to 1,500° C., in an atmosphere such as a reducing gas atmosphere or an inert gas (e.g., argon, helium, nitrogen as described above) atmosphere containing a very small amount of oxygen, to bring about active oxidation of the silicon carbide-based material on the particle surface and thereby obtain the objective carbon-based electrically conducting-inorganic substance phase-containing silicon carbide-based fine particles comprising a composite phase of a silicon carbide-based phase (first phase) and an electrically conducting substance layer mainly comprising carbon (second phase), in which the compositional ratio of the electrically conducting substance layer mainly comprising carbon (second phase) is gradiently increased toward the surface.

When the silicon carbide-based fine particles, and particularly the suitable fine particles comprising silicon, carbon, a metal such as titanium or zirconium, and oxygen, are fired in a reducing gas atmosphere such as carbon monoxide, a thermal decomposition reaction according to the following formula:

$$SiM_xC_yO_z \rightarrow SiC(s)+MC(s)+SiO(g)+C(s)$$

(wherein M represents a metal such as titanium or zirconium, x, y and z each represents an compositional shown by the molar ratio, s indicates a solid, and g indicates a gas)

takes place on the fine particle surface and SiO is lost from the fine particles, whereby a carbon-based electrically conducting substance phase-containing silicon carbide-based fine particles in which the compositional ratio of the electrically conducting substance layer mainly comprising carbon (second phase) is gradiently increased, can be obtained.

In the case of performing the firing in an inert gas, the decomposition involves desorption of carbon monoxide as in the following formula:

$$SiM_xC_yO_z \rightarrow SiC(s)+MC(s)+SiO(g)+CO(g)$$

(wherein M represents a metal such as titanium or zirconium, x, y and z each represents an compositional shown by the molar ratio, s indicates a solid, and g indicates a gas), but, by virtue of the resulting carbon monoxide atmosphere, the decomposition is suppressed and carbon can be allowed to remain in the fine particles. This decomposition reaction is carbon-diffusion-controlled and therefore, by controlling the conditions, a gradient structure can be formed.

The term "inert gas atmosphere containing a slight amount of oxygen" as used herein means an inert gas atmosphere containing oxygen in such a slight amount as satisfying the conditions of not forming $SiO_2$ but forming SiO (g) on the fine particle surface (conditions of causing active oxidation). The amount of oxygen cannot be indiscriminately specified, but the atmosphere is, for example, an argon gas atmosphere containing oxygen in an amount of 50 ppm in terms of the partial pressure.

The particle diameter of the electromagnetic wave absorbing material of the present invention is not particularly limited, but an average particle diameter of 0.5 to 20 μm, more preferably 1 to 10 μm, is preferred from the standpoint of producing an electromagnetic wave absorber having good electromagnetic wave absorbing characteristics. The particle shape is not particularly limited to a truly spherical shape in light of the function of absorbing electromagnetic waves, but, when kneading with an insulating matrix such as plastic is taken into consideration, the sphericity is preferably high.

The electromagnetic wave absorber of the present invention can be produced by compounding the above-described electrically conducting substance phase-containing silicon carbide-based fine particles and an insulating matrix.

Specific examples of the plastic which can be used as the insulating matrix include an epoxy resin, a polyester resin, a polyimide resin, a phenol resin, a polyurethane resin, a polyamide resin, a polycarbonate resin, a silicon resin, a phenoxy resin, a polyphenylene sulfide resin, a fluororesin, a hydrocarbon resin, a halogen-containing resin, an acrylic acid-based resin, an acrylonitrile-butadiene-styrene resin, an ultrahigh molecular weight polyethylene and a polystyrene. Among these plastic matrices, an epoxy resin and a polyimide resin are preferred.

A ceramic may also be used as the insulating matrix. Specific examples of the ceramic matrix include a nitride ceramic such as silicon nitride, aluminum nitride and hafnium nitride; an oxide ceramic such as alumina, magnesia, mullite and cordierite; and a glass material such as quartz glass and crystallized glass.

The electromagnetic wave absorber of the present invention may be prepared according to a method which is in itself known. In the case of using a thermoplastic plastic as the matrix, a melt-kneader generally employed in practice is used. Examples thereof include a single-screw extruder, a multi-screw extruder, a Banbury mixer, a roll and a Brabender Plastogram. As for the shaping, a technique generally employed in practice, such as vacuum molding, pneumatic molding, press molding and injection molding, may be used. In the case where the matrix is a ceramic, a ceramic powder and the fine particle of the present invention are mixed by a known method and the resulting powder is shaped and then sintered, whereby a electromagnetic wave absorber can be obtained.

The electromagnetic wave absorber of the present invention is a composite material comprising electrically conducting inorganic substance phase-containing silicon carbide-based fine particles and an insulating matrix, but in order to bring out the electromagnetic wave absorbing characteristics, it is necessary that an electric current resulting from absorption of electromagnetic waves by the electrically conducting-inorganic substance phase-containing silicon carbide-based fine particles as a electromagnetic wave absorbing material is propagated through the contact point between fine particles, as a so-called percolation of the electric current. The fine particle content of the electromagnetic wave absorber needs to be higher than the threshold value of percolation and is preferably 15 vol % or more, though this may vary depending on the particle shape or particle size distribution.

The electromagnetic wave absorber of the present invention may be constructed as a coating-type electromagnetic wave absorber comprising electrically conducting-inorganic substance phase-containing silicon carbide-based fine particles and an insulating binder. The particle diameter of the fine particles for use in the coating-type electromagnetic wave absorber is not particularly limited, but an average particle diameter of 1 to 20 μm is preferred from the standpoint of obtaining an electromagnetic wave absorber having good electromagnetic wave absorbing characteristics. The particle shape is not particularly limited to a truly spherical shape in light of the function of absorbing a electromagnetic wave, but when the fluidity of the coating material or filling after the coating is taken into consideration, a truly spherical shape is preferred.

As for the insulating binder, a resin may be used. Specific examples of the insulating resin which can be used include, but are not limited to, a polymer such as polyvinyl chloride, chlorinated polyethylene, polyethylene, polypropylene, an ethylene-vinyl acetate copolymer, polymethyl methacrylate, polystyrene, a styrene-butadiene-acrylonitrile copolymer, polyurethane, polyvinyl formal, epoxy, phenol, urea and silicon; and a rubber-type polymer such as acryl rubber (ACR), acrylonitrile-butadiene rubber (NBR), styrene-butadiene rubber (SBR), butadiene rubber (BR), natural rubber (NR), isoprene rubber (IR) and chloroprene rubber (CR).

For the usage at a high temperature, an insulating inorganic binder may be used. Specific examples of the insulating inorganic binder include silica sol, alumina sol, cement, gypsum and water glass.

The solvent may be sufficient if it can dissolve or disperse the insulating resin, and a general organic solvent or water may be used.

The coating material comprising electrically conducting-inorganic substance phase-containing silicon carbide-based fine particles, an insulating binder and a solvent may be prepared by a method which is in itself known. As for the mixing of these components, for example, a planetary mill, a homogenizer, a ball mill, a three-roll kneader and an ultrasonic treatment, may be employed. In the case of an inorganic binder, a solvent containing the above-described fine particles and the inorganic binder are mixed by the above-described means, and the mixture is coated and then sintered, whereby a electromagnetic wave absorbing layer can be obtained.

The coating-type electromagnetic wave absorber, which is one embodiment of the present invention, comprises electrically conducting-inorganic substance phase-containing silicon carbide-based fine particles, an insulating binder and a solvent, but in order to bring out the electromagnetic wave absorbing characteristics, it is necessary that an electric current resulting from absorption of a electromagnetic wave is propagated through the contact point between fine particles, as a so-called percolation of the electric current. The occurrence of percolation may be attained when the fine particle is contained at a ratio of 20 vol % or more per 100 vol % of the components in the coated film.

The coating-type electromagnetic wave absorber which is one embodiment of the present invention may be coated by known means and, for example, by using a spray gun, a roll coater, a curtain flow coater, a roller or a brush.

Japanese Unexamined Patent Publication (Kokai) No. 1-157598 discloses a electromagnetic wave absorber which is enhanced in the electromagnetic wave absorbing performance by having a structure such that a electromagnetic wave transmitting material is laminated on the electromagnetic wave incident surface. Also in the electromagnetic wave absorber of the present invention, the electromagnetic wave absorbing characteristics can be similarly enhanced by constructing a structure such that an electromagnetic wave transmitting material is laminated on the electromagnetic wave incident surface. Specific examples of the electromagnetic wave transmitting member which can be used in combination with the electromagnetic wave absorber of the present invention include fine glass particles.

EXAMPLES

The present invention is described below by referring to Examples.

Reference Example 1

Into a 5 liter-volume three-necked flask, 2.5 liter of anhydrous toluene and 400 g of metallic sodium were charged. The mixture was heated to a boiling point of toluene in a nitrogen gas stream, and 1 liter of dimethyldichlorosilane was added dropwise thereto over 1 hour. After the completion of dropwise addition, the system was refluxed under heating for 10 hours to produce a precipitate. The precipitate was filtered and washed first with methanol and then with water to obtain 420 g of polydimethylsilane as a white powder. Subsequently, 250 g of polydimethylsilane was charged into a three-necked flask equipped with a water-cooled refluxer and reacted under heating at 420° C. for 30 hours in a nitrogen stream to obtain polycarbosilane having a number average molecular weight of 1,200.

Thereafter, 100 g of toluene and 64 g of tetrabutoxyzirconium were added to 16 g of the polycarbosilane obtained above and after preheating at 100° C. for 1 hour, the temperature was gradually elevated to 150° C. to remove the toluene by distillation and the reaction was allowed to proceed for 5 hours in this state. Furthermore, the temperature was elevated to 340° C. and the reaction was allowed to proceed for 5 hours, thereby synthesizing a modified polycarbosilane.

Figure 1:
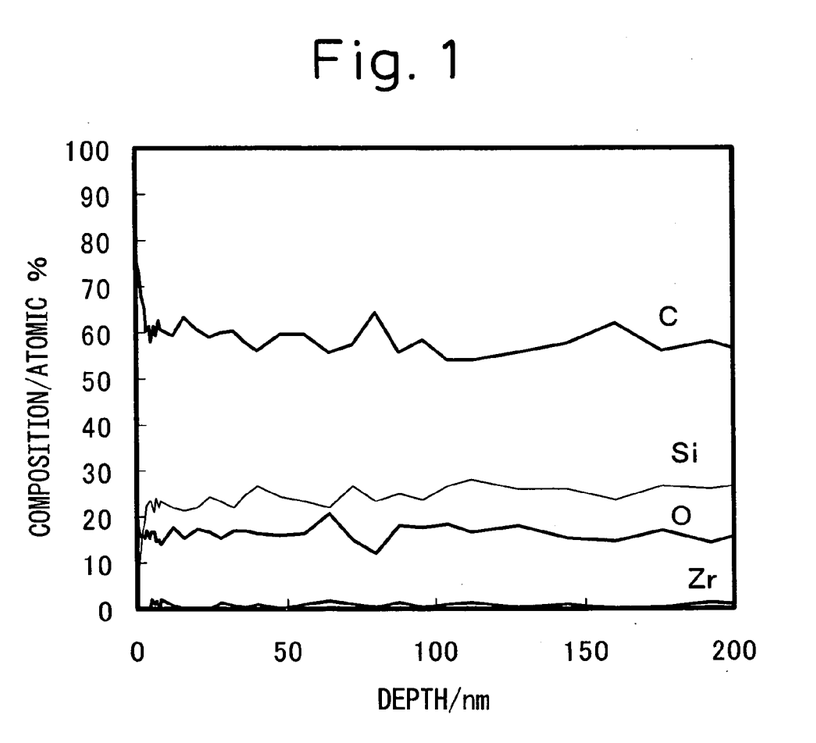
FIG. 1 shows the distributed state of constituent atoms by AES of the silicon carbide-based particles produced in Reference Example 1.
Figure 2:
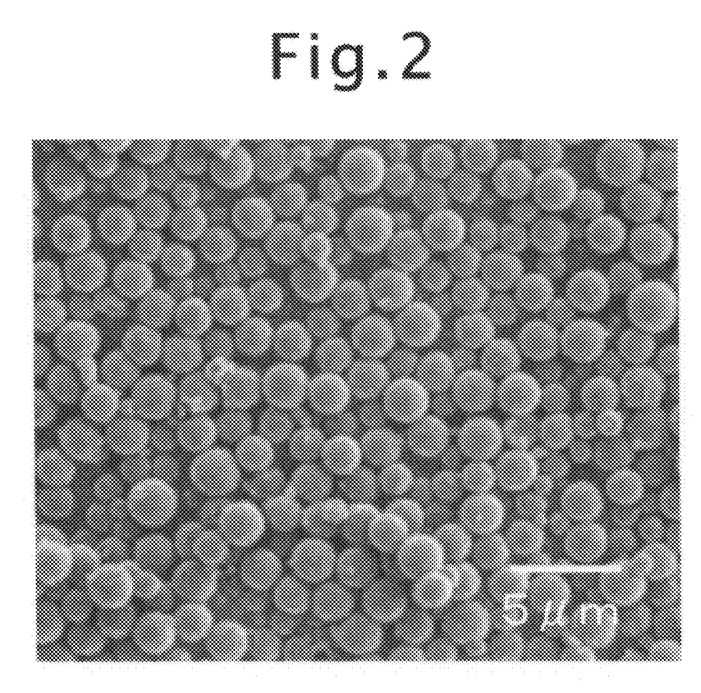
FIG. 2 is an SEM photograph of the silicon carbide-based particles produced in Reference Example 1.

This modified polycarbosilane was dissolved in xylene to prepare a xylene solution having a solid content concentration of 50 wt %. Subsequently, 60 g of this modified polycarbosilane solution was added dropwise to 300 g of 1,3-dimethyl-2-imidazolidinone heated at 125° C., and the system was cooled to 25° C. over 1 hour in the stationary state and further cooled with stirring to 5° C. over 1 hour. The produced liquid suspension was filtered to obtain about 30 g of modified polycarbosilane fine particles. The modified polycarbosilane fine particles were stepwise heated to 150° C. in the air, thereby infusibilized and then fired in an argon gas at 1,300° C. for 1 hour to obtain silicon carbide-based fine particles. As a result of X-ray diffraction, the fine particles were an amorphous material of silicon, zirconium and carbon. Also, the distribution state of constituent atoms was examined by AES and, as a result, the components of silicon, titanium, carbon and oxygen each showed a constant value from the outermost peripheral part to the inside (FIG. 1). The fine particles were truly spherical, and the average particle diameter thereof was 2 μm (FIG. 2).

Example 1

Figure 3:
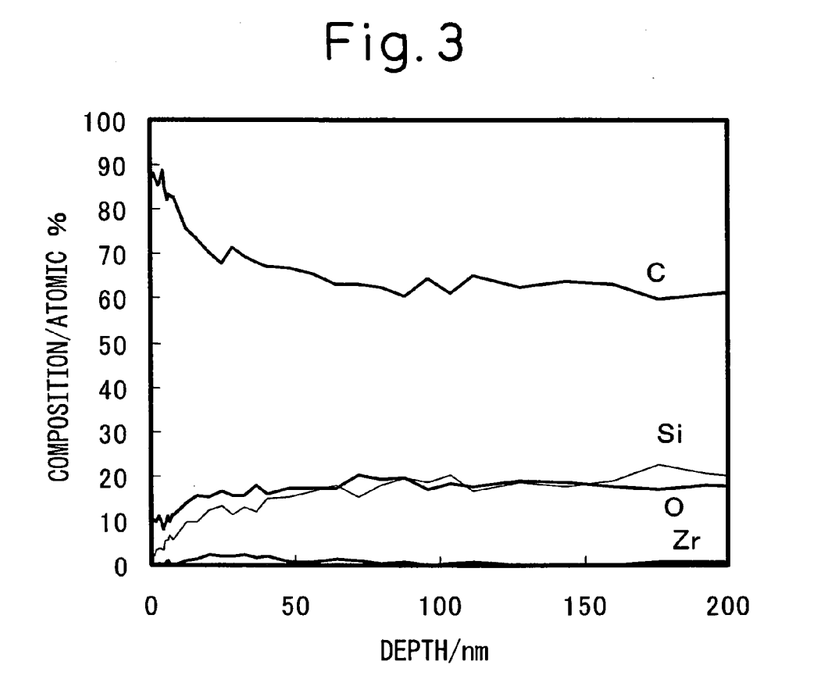
FIG. 3 shows the distribution state of constituent atoms by AES of the silicon carbide-based particles produced in Example 1.
Figure 4:
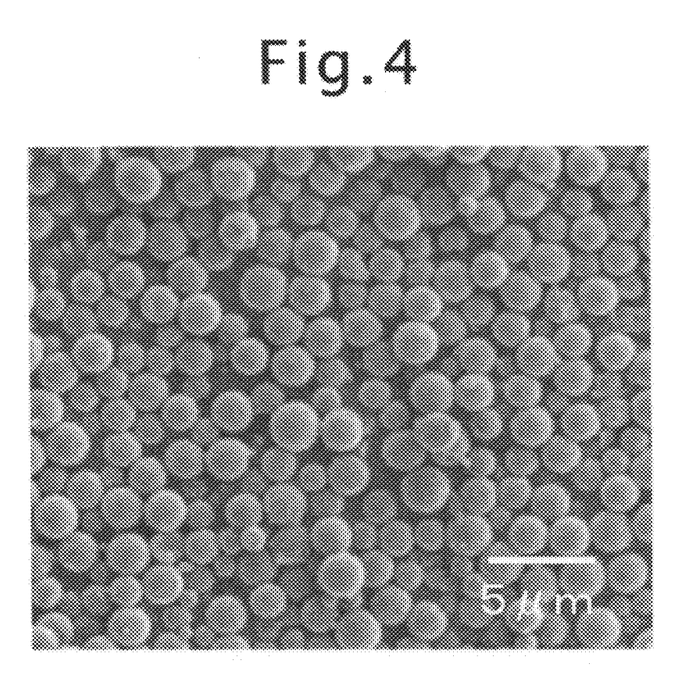
FIG. 4 is an SEM photograph of the silicon carbide-based particles produced in Example 1.

The silicon carbide-based fine particles obtained in Reference Example 1 were heat-treated in a CO gas atmosphere at 1,500° C. for 3 hours to obtain electrically conducting inorganic substance-containing silicon carbide-based fine particles. As a result of X-ray diffraction, the electrically conducting-inorganic substance-containing silicon carbide-based fine particles were an amorphous material of silicon, zirconium and carbon. Also, the distributed state of constituent atoms by AES was examined, as a result, the carbon was 90 mol % in the region of 2 nm from the outermost peripheral part, the carbon was gradiently decreased from 90 mol % to 60 mol % in the region of 2 to 30 nm deep from the outermost periphery, and the carbon showed a constant value of about 60 mol % in the region over 30 nm from the outermost periphery to the center part, confirming that a gradient composition with the carbon increasing toward the surface was created (FIG. 3). The fine particles were truly spherical, and the average particle diameter thereof was 2 μm (FIG. 4).

The measurements of transmission loss of the electromagnetic wave absorber were curried out using a vector network analyzer (HP8722D, manufactured Agilent Technologies Japan, Ltd.).

The electromagnetic wave gathered to 2 to 3 times the wavelength by a fluororesin-made lens was irradiated to the specimen placed at focal length, 170 mm. The limit of resolution was 1 Hz as the frequency and 0.01 dB as the electric power, the measurement frequency band was from 18 to 75 GHz, and the measurement was performed at 25° C.

30 Vol % of the electrically conducting-inorganic substance phase-containing silicon carbide-based fine particles obtained in Example 1 and 70 vol % of an epoxy resin were mixed by a rotation-revolution type kneader, cast in a mold and cured to produce a specimen of 50×50×4 (thickness) mm. The electromagnetic wave absorbing characteristics of this specimen were measured, as a result, a transmission loss of 20 dB or more was exhibited in the range from 18 to 75 GHz.

Example 2

40 Vol % of the electrically conducting-inorganic substance phase-containing silicon carbide-based fine particles obtained in Example 1 and 60 vol % of an epoxy resin were mixed by a rotation-revolution type kneader, cast in a mold and cured to produce a specimen of 50×50×4 (thickness) mm. The electromagnetic wave absorbing characteristics of this specimen were measured, as a result, a transmission loss of 40 dB or more was exhibited in the range from 18 to 75 GHz.

Example 3

Using the electrically conducting-inorganic substance phase-containing silicon carbide-based fine particles used in Example 1, 50 wt % of the fine particles, 5 wt % of polyvinyl alcohol and 45 wt % of water were kneaded by a kneader to prepare a electromagnetic wave absorbing paint. This paint was coated on an epoxy resin plate of 50×50 mm (5 mm thick) by spin coating and dried to obtain a specimen having a 100 μm-thick coating film. The electromagnetic wave absorbing characteristics of this specimen were measured and, as a result, a transmission loss of 10 dB or more was exhibited in the range from 18 to 75 GHz.

Comparative Example 1

30 Vol % of the silicon carbide-based fine particles obtained in Reference Example 1 and 70 vol % of an epoxy resin were mixed by a rotation-revolution type kneader, cast in a mold and cured to produce a specimen of 50×50 mm (4 mm thick). Electromagnetic waves were entered into this electromagnetic wave absorber, but the transmission loss in the range from 18 to 75 GHz was 2 dB or less and effective electromagnetic wave absorbing characteristics could not be obtained.

In the Examples above, a polyzirconocarbosilane was used as an example of the modified polycarbonosilane, but it is apparent that even when a polytitanocarbonosilane is used, electrically conducting-inorganic substance-containing silicon carbide-based fine particles, an electromagnetic wave absorbing material and the electromagnetic wave absorber of the present invention can be produced in the same manner

INDUSTRIAL APPLICABILITY

The electromagnetic wave absorbing material comprising the electrically conducting-inorganic substance-containing silicon carbide-based fine particles of the present invention can selectively absorb electromagnetic waves of 1 to 300 GHz in a wide band, has a fine particle shape and therefore, can be utilized as a electromagnetic wave absorbing material over a wide range.

The invention claimed is:

1. Silicon carbide-based fine spherical particles having an average particle size of 0.5 to 20 μm and containing an electrically conducting inorganic substance, comprising a particle inner portion of a silicon carbide-based material and a surface layer comprising an electrically conducting inorganic substance mainly comprising carbon, the surface layer covering the entire surface of the spherical particle, wherein the surface layer forms an electrically conducting inorganic substance gradient layer with the compositional ratio of the electrically conducting inorganic substance gradiently increasing toward the particle surface and the thickness of the electrically conducting inorganic substance gradient layer is from 1 to 500 nm.

2. The silicon carbide-based fine spherical particles as claimed in claim 1, wherein the silicon carbide-based fine particles further contain at least one member selected from the group consisting of titanium and zirconium.

3. The silicon carbide-based fine spherical particles as claimed in claim 2, wherein the elemental composition of the particle inner portion of a silicon carbide-based material comprises from 20 to 60 mass % of Si, from 0.5 to 10 mass % of at least one member selected from Ti and Zr, from 25 to 65 mass % of C and from 5 to 30 mass % of O.

4. The silicon carbide-based fine spherical particles as claimed in claim 2, wherein the elemental composition of the particle inner portion of a silicon carbide-based material comprises from 25 to 50 mass % of Si, from 0.5 to 8 mass % of at least one member selected from Ti and Zr, from 30 to 55 mass % of C and from 5 to 20 mass % of O.

5. The silicon carbide-based fine spherical particles as claimed in claim 1, wherein the elemental composition of the surface layer comprises from 0 to 40 mass % of Si, from 0 to 12 mass % of at least one member selected from Ti and Zr, from 50 to 100 mass % of C and from 0 to 25 mass % of O.

6. The silicon carbide-based fine spherical particles as claimed in claim 1, wherein, in the surface layer, the compositional ratio of carbon gradiently increases toward the particle surface and the compositional ratio of Si gradiently decreases toward the particle surface.

7. The silicon carbide-based fine spherical as claimed in claim 1, which is produced through the following steps:
  (a) providing a precursor polymer comprising a modified polycarbosilane having a structure such that primarily a polycarbosilane having a number average molecular weight of 200 to 10,000 and having a main chain skeleton represented by the formula:

(wherein R represents a hydrogen atom, a lower alkyl or a phenyl group) is modified with an organic metal compound containing titanium or zirconium,
  (b) microparticulating the precursor polymer to form precursor polymer fine particles,
  (c) preheating the precursor polymer fine particles in an oxygen-containing atmosphere, to infusibilize the precursor polymer fine particles,
  (d) firing the infusibilized precursor polymer fine particles in an inert gas atmosphere to obtain silicon carbide-based fine particles, and
  (e) high-temperature treating the silicon carbide-based fine particles, in a reducing atmosphere or an inert gas atmosphere at a temperature in a range of 1,000 to 1,500° C., to gradiently increase the compositional ratio of the electrically conducting inorganic substance from the inside to the surface in the surface part of the silicon carbide-based fine particles.

8. The silicon carbide-based fine spherical particles as claimed in claim 7, wherein said microparticulating the precursor polymer is performed by a cooling crystallization method of mixing and heating the precursor polymer with a solvent of the precursor polymer, to dissolve the precursor polymer in the solvent, and cooling the obtained solution to precipitate precursor polymer fine particles.

9. The silicon carbide-based fine spherical particles as claimed in claim 7, wherein said microparticulating the precursor polymer is performed by a spray drying method of mixing and heating the precursor polymer with a solvent of the precursor polymer, to dissolve the precursor polymer in the solvent, and spraying and hot-air drying the obtained solution to form precursor polymer fine particles.

10. An electromagnetic wave absorbing material comprising the silicon carbide-based fine spherical particles as claimed in any one of claims 1 to 6 and 7 to 9.

11. An electromagnetic wave absorber comprising the electromagnetic wave absorbing material claimed in claim 10 and an insulating matrix.

12. A coating-type electromagnetic wave absorber comprising the electromagnetic wave absorbing material claimed in claim 10 and an insulating binder.

13. A coating composition comprising the silicon carbide-based fine spherical particles as claimed in claim 1 and a resin, the amount of the silicon carbide-based fine particles being at least 20% by volume of the coating composition.

14. The coating composition as claimed in claim 13, wherein said resin is an epoxy resin.

15. A process for producing an electromagnetic wave absorber, comprising providing the coating composition as claimed in claim 13 and a resin, and coating said coating composition on a substrate to form an electromagnetic wave absorber.

* * * * *